United States Patent [19]

Chichester et al.

[11] Patent Number: 5,450,875
[45] Date of Patent: Sep. 19, 1995

[54] FOR A REFRIGERANT SERVICE LINE COUPLING DEVICE

[75] Inventors: Dennis B. Chichester; Steven M. Knowles, both of Fishers, Ind.

[73] Assignee: White Industries, LLC, Indianapolis, Ind.

[21] Appl. No.: 98,192

[22] Filed: Jul. 28, 1993

[51] Int. Cl.⁶ .............................................. F16L 37/28
[52] U.S. Cl. ............................ 137/614.05; 251/149.6; 62/50.7
[58] Field of Search .............. 137/614, 614.06, 614.04, 137/614.03, 614.05; 251/149.1, 149.9, 149.6; 62/292, 50.7

[56] References Cited

U.S. PATENT DOCUMENTS

| | | |
|---|---|---|
| 104,025 | 6/1870 | Harvey . |
| 2,473,223 | 6/1949 | Scheiwer . |
| 2,543,589 | 2/1951 | Newcomb . |
| 2,696,993 | 12/1954 | Buckler . |
| 2,739,612 | 3/1956 | Hansen . |
| 3,295,584 | 1/1967 | Proctor . |
| 3,424,181 | 1/1969 | Morse . |
| 3,687,161 | 8/1972 | Grguric et al. . |
| 3,916,641 | 11/1975 | Mullins . |
| 4,069,686 | 1/1978 | Hoelman . |
| 4,078,578 | 3/1978 | Buchholz . |
| 4,182,370 | 1/1980 | Karcher . |
| 4,476,892 | 10/1984 | Boyce . |
| 4,537,384 | 8/1985 | Peterson et al. . |
| 4,582,295 | 4/1986 | Kugler et al. . |
| 4,805,417 | 2/1989 | Weaver . |
| 4,921,013 | 5/1990 | Spalink . |
| 5,076,324 | 12/1991 | Herman et al. . |
| 5,139,049 | 8/1992 | Jensen . |
| 5,149,053 | 9/1992 | Galli ........................ 251/149.9 |
| 5,293,902 | 3/1994 | Lapierie ................. 137/614.04 |

FOREIGN PATENT DOCUMENTS

2111154 6/1983 United Kingdom ........... 137/614.06

Primary Examiner—Martin P. Schwadron
Assistant Examiner—Kevin L. Lee
Attorney, Agent, or Firm—Bose McKinney & Evans

[57] ABSTRACT

A coupling member is provided for coupling a refrigerant line to a refrigerant port of a refrigeration system. The coupling member includes a generally cylindrical body member having a proximal end portion, a distal end portion, a radially inwardly facing surface defining an axially extending interior passageway, and a radially outwardly facing surface. The radially inwardly facing surface includes a circumferential fluid passageway portion. A radially extending fluid inlet passageway extends between the circumferential fluid passageway and the radially outwardly facing surface. An inner sleeve member is disposed in the axially extending interior passageway for axial movement therein. The inner sleeve member includes a wall having a radially inwardly facing surface defining an interior of the inner sleeve member, and a radially outwardly facing surface defining a boundary of the circumferential fluid passageway. A pin depressor member is disposed at least partially in the interior of the inner sleeve. A control cap member is adjustably positioned with respect to the body. A member is also provided for coupling the control cap member and the inner sleeve member so that adjustment of the axial position of the control cap member imparts axial movement to the inner sleeve member and the pin depressor member.

25 Claims, 6 Drawing Sheets

FOR A REFRIGERANT SERVICE LINE COUPLING DEVICE

TECHNICAL FIELD OF THE INVENTION

The present invention relates to refrigeration servicing equipment, and more particularly to coupling members for coupling a refrigeration system to a refrigerant supply or evacuating line of a refrigeration servicing device, to enable refrigerant to flow between the refrigeration device and the refrigerant servicing device.

BACKGROUND OF THE INVENTION

Refrigeration systems have existed for years. Although a wide variety of refrigeration systems exist, the majority of refrigeration systems in use today use a chlorofluorocarbon (CFC) refrigerant such as FREON brand refrigerant manufactured by DuPont Chemicals, unit of E.I. DuPont de Neumours. In automotive air conditioner applications, the most popular refrigerant in use today is a CFC refrigerant known as "R-12." In residential and commercial buildings, the most common refrigerant is a refrigerant known as "R-22."

Problems exist with these refrigerants in that both are believed to have an adverse environmental impact. In particular, R-12 refrigerant is believed to contribute substantially to the depletion of the ozone layer in the atmosphere. To reduce the environmental damage caused by these CFC refrigerants, and in particular R-12, the Government of the United States, and governments of other countries have instituted regulations which will require refrigeration systems manufacturers and owners to reduce, and ultimately cease using R-12 refrigerant within the near future. Already, manufacturers of R-12 refrigerant have substantially reduced the quantities of R-12 refrigerant manufactured, thus substantially decreasing the availability of R-12 refrigerant.

Although R-12 refrigerant will no longer be available, refrigeration systems using R-12 refrigerant will still exist and be in use. As such, these R-12 refrigeration systems will, from time to time, require replenishment of the refrigerant. Because of the likely unavailability of R-12 refrigerant in the near future, an alternate refrigerant will be needed to replace the R-12 refrigerant that is more "environmentally friendly" than R-12. One such environmentally friendly refrigerant is a refrigerant designated as "R-134A." Although refrigerant R-134A has been found to be an effective refrigerant, problems exist with its use in R-12 refrigeration systems. Primarily, these problems relate to R-134A's incompatibility with R-12 refrigerant, and the incompatibility of the lubricating oils used with R-12 and R-134A. Because of this incompatibility, the R-12 refrigerant and mineral oil must be removed from a refrigeration system before R-134A refrigerant (with lubricating oil) is placed into the refrigeration system. Once R-134A refrigerant is placed into the system, it is important to not put any R-12 refrigerant back into the refrigeration system which then contains R-134A. The cross contamination of R-12 and R-134A refrigerant could cause considerable damage to the refrigeration system and any service equipment used on the refrigeration system.

To help ensure that R-12 refrigerant is not placed into a refrigeration system containing R-134A refrigerant, standards have been created that mandate that the type of refrigerant port used for refrigeration systems containing R-134A refrigerant be different than refrigerant ports in refrigeration systems using R-12. In refrigeration systems that previously contained R-12, a new refrigerant port, or conversion firing as required by SAE Standard J1661 must be fired over the existing refrigerant port. This new refrigerant port must contain the "R-134A profile," (SAE J639) in order to enable R-134A refrigerant to be introduced into the refrigerant system.

Although the profile of the R-134A refrigerant port has been established by the Society of Automotive Engineers, the production of a retro-fit R-134A port has not been that simple and straight forward. In particular, it has been difficult to create a refrigerant port which contains the R-134A profile, and which does not require an undue amount of additional space. Another desired feature is to create an R-134A conversion or retro-fit port that will be difficult to remove once installed. The R-134A retro-fit refrigerant port should be difficult to remove to reduce the likelihood that a user will later remove the 134A refrigerant port so that he can reintroduce R-12 refrigerant back into the refrigeration system.

Therefore, one object of the present invention is to provide a retro-fit R-134A port which both minimizes the additional space required for the port, and is difficult for a user to remove.

Another aspect of the conversion of a refrigeration system from one using R-12 refrigerant to one using R-134A refrigerant is to provide a suitable coupling member for enabling a refrigerant service line to be coupled to the refrigerant port. As will be appreciated by those familiar with automotive engineering, the engine compartments of automobiles are becoming more and more crowded. Various regulations relating to air quality standards and gas mileage standards, along with an increasing array of optional equipment, have caused a severe shortage of space or "real estate" under the hood of a car. This shortage of "real estate" in the engine compartment has increased the difficulty of performing service on automobiles, because of the difficulty in getting a tool (such as a wrench or refrigerant servicing coupling) to the part that needs to be serviced. This problem is particularly acute with newer model cars, and with the refrigerant servicing ports on the refrigeration (air conditioning) systems of these newer cars. Compounding this problem is the larger size of most field service couplings used to service R-134A systems.

Prior refrigerant couplings typically were generally cylindrical in nature. At one end of the cylinder was the orifice which fit over the refrigerant port to engage the coupling member to the refrigerant port. A refrigerant servicing line extended axially outwardly at the opposite end of the cylindrical coupling or perpendicular to the axis out the side of the body. As will be appreciated, a coupling with the hose extended axially would generally have an effective length which extended from the receiving portion of the coupling to that portion of the hose which could be "bent away" from a straight line relationship with the coupling. Thus, it will be appreciated that such a coupling would tend to have a relatively long overall effective length. Unfortunately, couplings such as the ones described above (even those with the hose extended perpendicular out the side of the body) often can be too long for use with some automotive vehicles (and some other building-based systems) wherein length restrictions preclude the use of such a relatively long coupling. This problem of too lengthy couplings is made even worse when the conversion fittings are used, which extends the length of the male fitting also. Examples of prior art refrigerant coupling members are those manufactured by the Aeroquip Corp., Classic Tool, Master Cool, T.I.F., and the Assignee, K-Whit Tools, Inc.

It is therefore also one object of the present invention to produce a refrigerant coupling member which overcomes this problem by having a relatively more compact size and a reduced effective length, to foster the use of the coupling in places where longer-length couplings will not work.

SUMMARY OF THE INVENTION

In accordance with the present invention, a refrigerant port is provided which can be coupled to an existing refrigerant port to permit a refrigeration system to accept an alternate refrigerant. The refrigerant port comprises a generally cylindrical body portion having a radially inner surface defining an axially extending passageway, a radially outer surface, a proximal portion, and a distal end portion. The radially inner surface has a threaded distal portion for engaging an outer surface of the existing refrigerant port. The radially outer surface includes at least two concavely arcuate slot members for receiving a slot engaging tool. Preferably, the refrigerant port has a raised race portion which extends radially outwardly from adjoining portions of the radially outer surface. The arcuate slot members are formed to extend axially on this race portion. A pin extender member is provided which is insertable into the refrigerant port. The pin extender member includes a body having a ring portion with a threaded radially outer surface and a radially inner surface defining an axially extending passageway. The pin extender member also includes a bridge portion extending diametrally between opposite points on the ring portion, with the bridge portion including an axially extending hole for receiving the pin member. The bridge portion and ring portion are positioned to permit fluid flow through the ring portion and around the bridge portion.

In another aspect of the present invention, a coupling member is provided for coupling a refrigerant line to a refrigerant port of a refrigeration system. The coupling member comprises a generally cylindrical outer body member having a proximal end portion, a distal end portion, a radially inwardly facing surface defining an axially extending interior passageway, and a radially outwardly facing surface. The radially inwardly facing surface includes a circumferential fluid passageway portion. A radially extending fluid inlet passageway extends between the circumferential fluid passageway and the radially outwardly facing surface. An inner body member is disposed in the axially extending interior passageway for axial movement therein. The inner body member includes a wall having a radially inwardly facing surface defining an interior of the inner body member, and a radially outwardly facing surface defining a boundary of the circumferential fluid passageway. A pin depressor member is disposed at least partially in the interior of the inner body member. A control cap member is adjustably positioned with respect to the body. A means is also provided for joining together the control cap member and the inner body member so that adjustment of the axial position of the control cap member imparts axial movement to the inner body member and the pin depressor member.

In a preferred embodiment of the present invention, the pin depressor member includes a gasket which is engageable with a valve seat which is formed as a part of the inner body member. A biasing means is providing for biasing the pin depressor into engagement with the valve seat to prevent the flow of fluid through the coupling member. However, when the bridge portion and pin depressor engages the face of a refrigerant port, the gasket is moved away from the valve seat to allow fluid to flow through the coupling member and into the refrigeration system to be serviced, or out of the refrigeration system to be serviced. Additionally, the coupling member includes a fluid conduit port which is coupled to the radially extending fluid inlet passageway for coupling a refrigerant line to the coupling member.

One feature of the present invention is that a refrigerant member is provided that includes a side entering refrigerant line. This side entering refrigerant line permits the coupling member to have a compact structure, and reduces the effective length of the coupling member. By so reducing the effective length, the coupling member of the present invention can be used in service situations wherein a longer coupling member could not be used.

Another feature of the present invention is that means are included for providing a tight, sealing engagement between the coupling member and the refrigerant port. Additionally, means are provided for only permitting the refrigerant to flow through the coupling member, and out the refrigerant port when the coupling member is engaged with the refrigerant port in a sealing relation. This feature has the advantage of reducing the likelihood that refrigerant will escape from the refrigerant port when the refrigerant coupling member is coupled to the refrigerant port of the refrigeration system to be serviced. This feature also prevents any escape of refrigerant should the coupling be disconnected from the port without closing the coupling first, since the coupling will not remain open unless properly connected to a port.

These and other features of the present invention will become apparent to those skilled in the art upon review of the best mode of practicing the present invention, as described in more detail below.

BRIEF DESCRIPTION OF THE DRAWINGS

FIG. 8 is a sectional view of a refrigerant servicing line coupling of the present invention similar to FIG. 7, showing the coupling and refrigerant port in the "open"

position with the pin depressor member in its fully depressed position;

FIG. 9 is a sectional view taken along lines 9—9 of FIG. 1.

DETAILED DESCRIPTION

Figure 1:
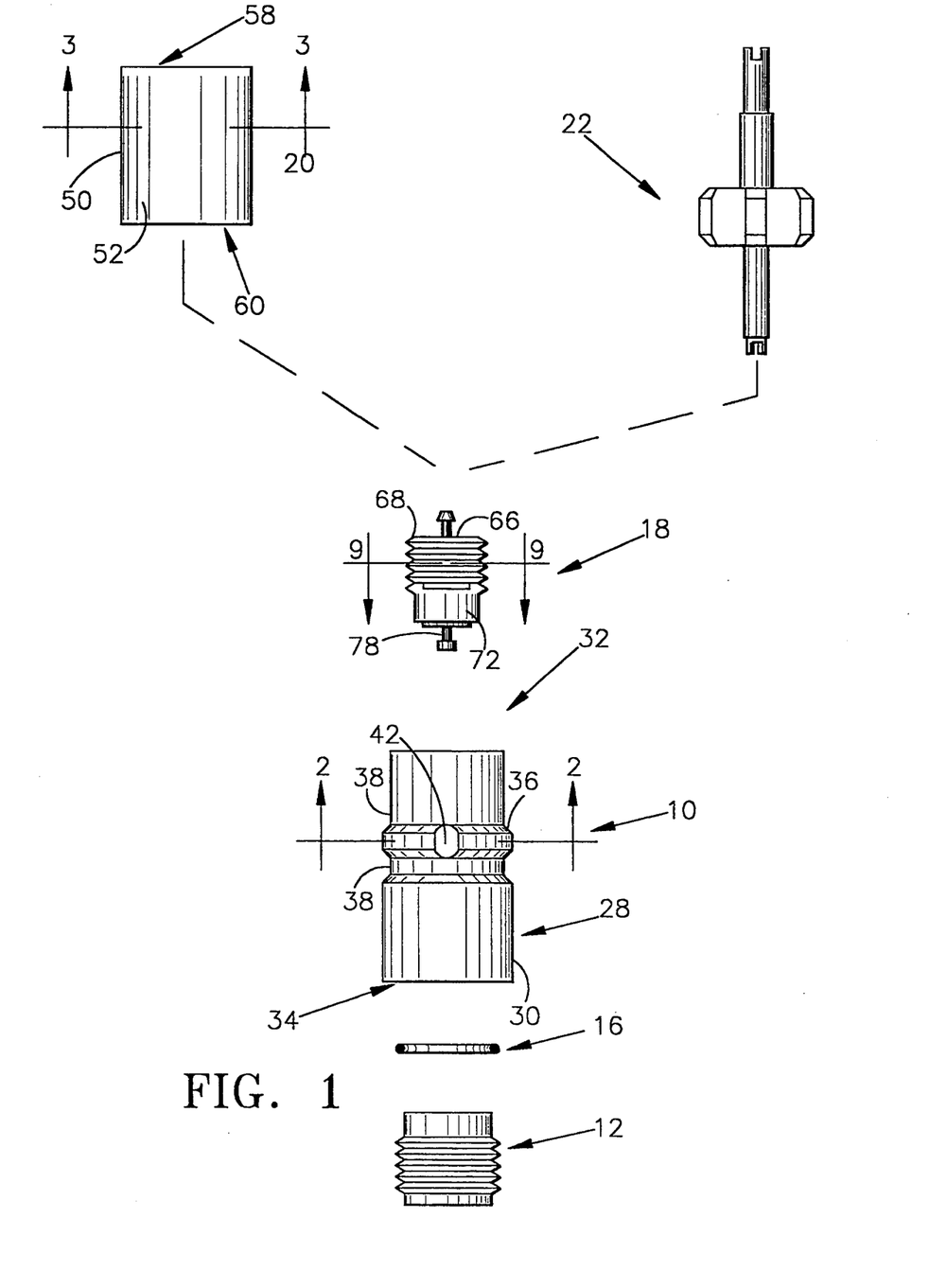
FIG. 1 is an exploded view of the retro-fit refrigerant port of the present invention.

A retro-fit refrigerant port 10 is shown in FIG. 1 for fitting over, and being coupled to an existing refrigerant port 12. The retro-fit refrigerant port 10 is sized for accepting the coupling of an air conditioning service machine for either inserting or withdrawing refrigerant type R-134A from a refrigeration system to be serviced. The existing refrigerant port 12 is designed for accepting a refrigerant service coupling of the type used when either inserting or withdrawing refrigerant R-12 from the refrigeration system.

A gasket 16 is interposed between the retro-fit refrigerant port 10 and the existing refrigerant port 12 to provide a leak-proof seal between the retro-fit refrigerant port 10 and the existing refrigerant port 12. A pin extender 18 can be inserted into the interior of the retro-fit refrigerant port 10. The function and purpose of the pin extender 18 will be described in greater detail below. A slot engaging tool 20 is provided for tightening the retro-fit refrigerant port 10 onto the existing refrigerant port 12. The slot engaging tool 20 is similar to a socket of a socket wrench set. The slot engaging tool 20 can be wrench driven. Alternately, the tool can include a series of axially extending ribs on its radially outer surface to enable the tool to be rotated by hand in applications where there is not enough space for a wrench handle. A standard valve core removal tool 22 is provided for inserting and removing the pin extender 18 into the retro-fit refrigerant port 10. The valve core removal tool 22 is one that can be used also to remove the Schrader valve 29 which is typically contained within the existing refrigerant port 12. Valve core removal tool 22 of the type shown are in wide circulation, and are available from a wide variety of sources. Although tool 22 can remove the Schrader valve 29 core, the present invention contemplates that normally a new R-134A compatible Schrader valve 29 will remain in place after the retro-fit refrigerant port 10 is placed over and affixed to the existing refrigerant port 12.

Figure 2:
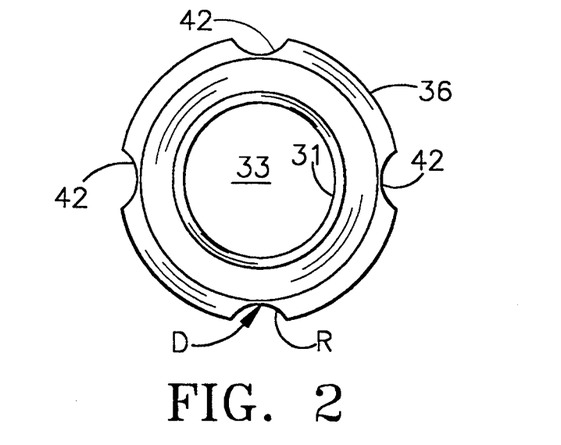
FIG. 2 is an enlarged, sectional view taken along lines 2—2 of the FIG. 1.
Figure 5:
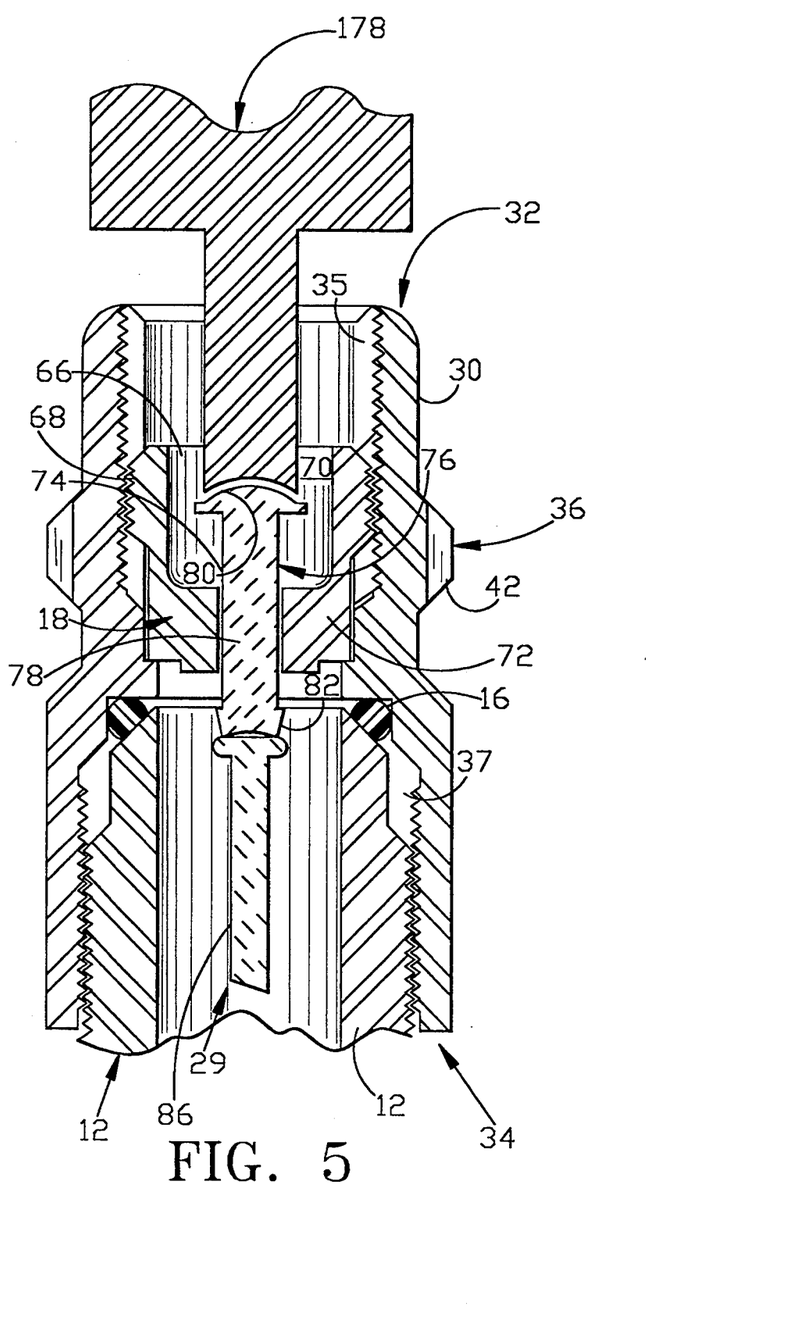
FIG. 5 is an enlarged, sectional view taken along lines 5—5 of FIG. 4, showing the pin extender member in its fully retracted position.
Figure 6:
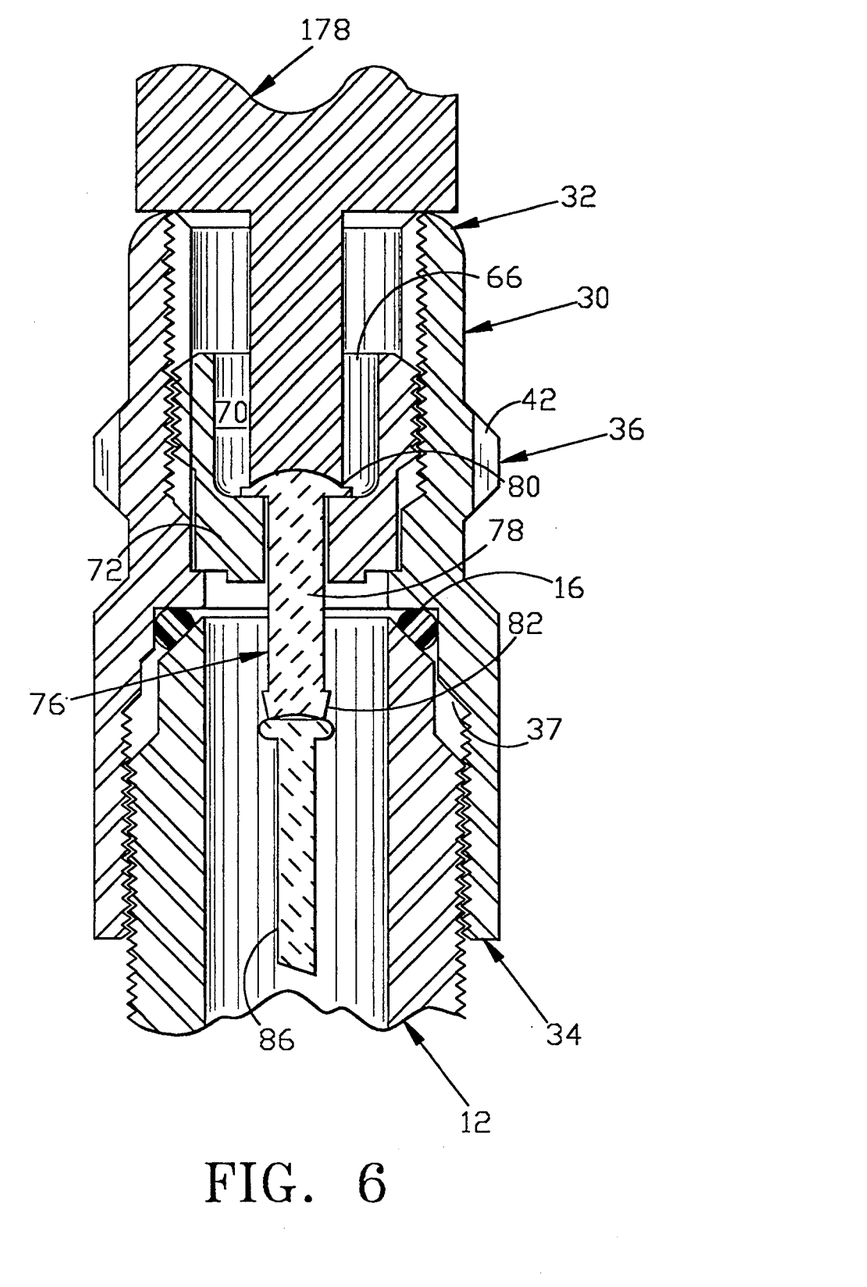
FIG. 6 is an enlarged, sectional view similar to FIG. 5, showing the pin of the pin extender member in its fully depressed position.

The retro-fit refrigerant port 10 is best shown in FIGS. 1 and 2 as including a generally cylindrical body portion 28, having a radially facing outer surface 30, and a radially facing inner surface 31. The radially facing inner surface 31 defines a generally axially extending, hollow interior 33 which provides a passageway between the proximal end portion 32 and the distal end portion 34 of the body portion 28. As best shown in FIG. 5, the radially inner surface 31 at both the distal end portion 34 and at the proximal end portion 32 contains threads 35 (proximal portion 32), and 37 (distal portion 34). The pin extender member 18 is received by the threads 35 at the proximal end portion 32 of the retro-fit valve 10. The threads 37 at the distal end portion 34 of the retro-fit valve 10 are provided for interiorly receiving the existing refrigerant port 12.

The radially outer surface 30 of the retro-fit port 10 has a profile which has been established by the Society of Automotive Engineers (SAE Standard J639), to be that profile which is sized and shaped for accepting a service coupling for inserting and withdrawing refrigerant type R-134A. The SAE profile prescribes the general shape and dimensions of the exterior radially outer surface 30 for both ports for "high pressure side" and "low pressure side" applications. Although including a raised race portion 36 which extends radially outwardly from adjoining portions 38 of the radially outer surface 30, the SAE design makes no provision for slot members 42. Without the slot members 42, the entire cross section of the retro-fit port 10 is generally circular, having varying diameters. This configuration makes it difficult for a tool to engage the retro-fit port 10 to affix the retro-fit port 10 to the existing refrigerant port 12.

The first known attempt to overcome this problem (by persons other than the Applicants) was to extend the length of the profile by adding a hex-shaped surface which was disposed below the end of the distal portion 34 of the retro-fit port 10. By placing such a hex-shape surface, the retro-fit port 10 could be gripped by a socket wrench or the like to be inserted and removed. In order to make the hex surface grippable by a socket wrench (which would need to pass over the race 36), the radially measured dimension of the retro-fit port 10 at the hex surface had to be increased so that the diameter of the hex surface (not shown) was wider than the widest point (race 36) of the retro-fit port 10. Additionally, the use of the hex added length to the retro-fit port 10. Although the addition of the hex did permit the retro-fit port 10 to be gripped by a wrench, serious drawbacks existed. Primarily, the additional width and length presented by the hex made the refrigerant port too large for some automotive applications. Additionally, a socket wrench is a very common tool, as is a crescent wrench, box wrench, or open end wrench, all of which were capable of gripping the hex-shaped portion or any other wrenching flat configuration, and thus capable of removing the retro-fit port 10. Thus, the use of the hex-shaped end significantly increased the likelihood that a user would try to remove the retro-fit refrigerant port 10 and insert R-12 type refrigerant into a system through the existing refrigerant port 12 (in direct conflict with SAE retro-fit specification J1660).

The Applicants' invention sought to overcome these two problems associated with the hex-shaped (wrench flat) portion.

Turning now to the race 36, it will be noted that the race contains four generally concave, arcuate slots 42 formed thereon. The arcuate slots 42 are spaced at approximately 90° between each other. The arcuate slots 42 provide a surface which can be gripped by a tool, such as slot engaging tool 20, to insert the retro-fit port 10 onto an existing refrigerant recovery port 12. Because of the general uncommonness of the shape and positioning of the slot 42 arrangement, it is unlikely that a user would have a tool capable of removing the retro-fit port 10. Therefore, the likelihood that the retro-fit port 10 would be removed from the existing refrigerant port 12 by a user is reduced substantially.

Figure 3:
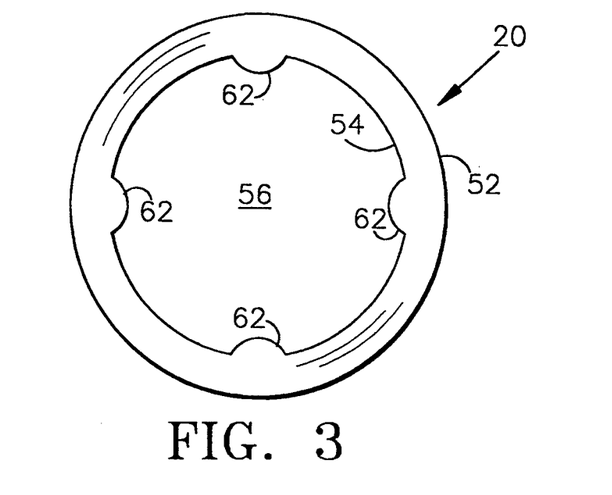
FIG. 3 is a sectional view taken along lines 3—3 of FIG. 1.
Figure 4:
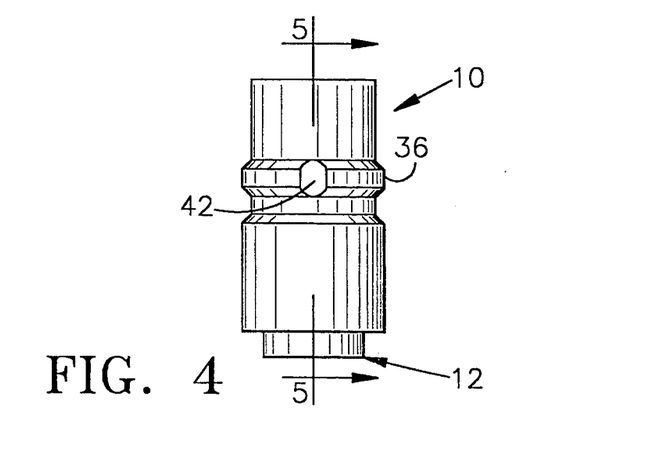
FIG. 4 is a side view of a "low pressure side" retro-fit refrigerant port of the present invention.

The slot engaging tool 20 for inserting the retro-fit port is best shown in FIGS. 1 and 3 as being generally similar to a socket which is used with a socket wrench type tool. The slot engaging tool 20 has a generally cylindrical body 50 having a radially outer surface 52 and a radially inner surface 54 which defines a hollow interior 56. The generally cylindrical body 50 includes a proximal end portion 58 which can be provided with a square aperture (not shown) for engaging a tool handle, such as a socket wrench tool handle (not shown), and a distal end portion 60, or alternately provided with ribs for rotation of the tool 20 by hand. Distal end portion 60 is sized for interiorly receiving the retro-fit port 10. As best shown in FIG. 3, the slot engaging tool 20 includes a series of four spaced convexly arcuate axially extending slot engaging members 62 which are sized and positioned for engaging the four arcuate slot members 42 which are formed on the race 36 of the retro-fit port 10. Preferably, the slot engaging members 62 extend along substantially the full axial length of the radially inner surface 54.

Figures 8, 9:
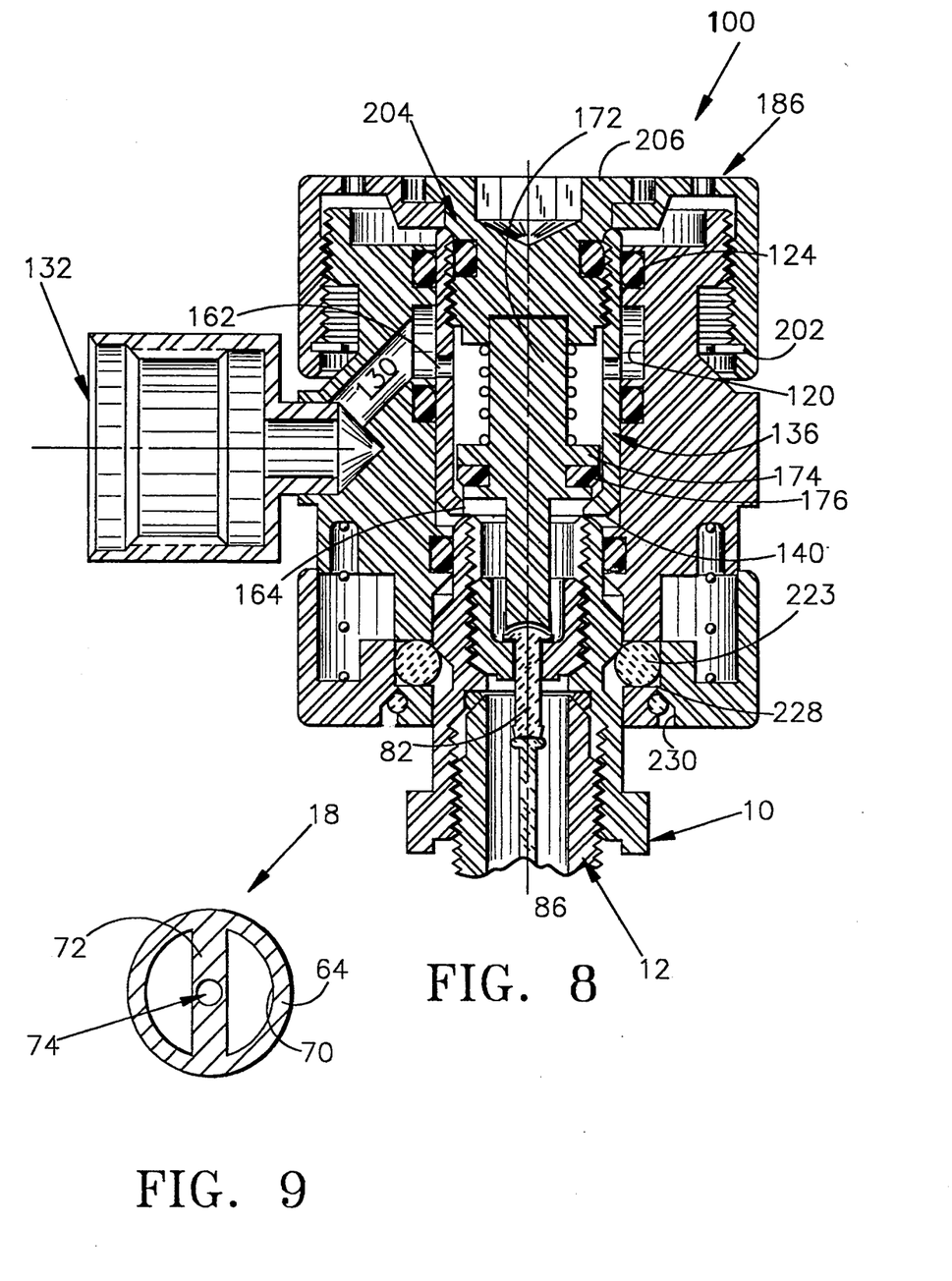

The pin extender member 18 is best shown in FIGS. 1, 5 and 9 as including a body 64 (FIG. 9) having a ring portion 66 and a bridge portion 72. The ring portion 66 and the bridge portion 72 are disposed in an axially offset relation. The ring portion 66 includes a threaded radially outer surface 68 for threadedly engaging the threads 35 of the radially inner surface of the retro-fit port 10. The ring portion 66 also includes a non-threaded radially inner surface 70 which defines an interior through which fluid can flow. The bridge portion 72 extends diametrally between opposite points on the ring portion 66. The bridge portion 72 includes an axially extending hole 74 for receiving a pin member 76 which is capable of axial movement within the axially extending hole 74.

The pin member 76 includes a shaft portion 78 insertable in the axially extending slot 74. A first convexly shaped head portion 80 is disposed at one end of the shaft portion 78, and a second, frusto-conical shaped head portion 82 (having a concave end surface), is disposed at the other end of the shaft portion 78. The first and second heads 80, 82 are formed unitarily with the shaft portion 78. The second head 82 is of a sufficiently small size (or is otherwise sufficiently deformable), so that it can be press-fit through the axially extending slot 74. However, both of the first and second heads 80, 82 are sized and shaped so that once the pin member 76 is inserted into the axially extending slot 74, the head portions 80, 82 will prevent the pin member 76 from being removed from the axially extending slot 74. It will also be appreciated that the first and second heads 80, 82 serve as a limit to the axial movement of the pin member 76. The first head 80 has a convex end surface to enable it to better mate with the concave end of the depressing member 178 of coupling 100. The second head has a concave end surface to enable the second head 82 to mate with the open/close pin 86 of the Schrader valve 29.

When the pin extender member 18 is engaged in the proximal portion 32 of the retro-fit port 10, and the retro-fit port 10 is threaded over the existing refrigerant port 12, the pin member 76 is sized and positioned so that axial movement of the pin member 76 will cause the concave surface of the second head 82 of the pin member to engage an open/close pin 86 of a Schrader valve 29 contained within the existing refrigerant port 12. The pin extender 18 is in a position so that when a pin depressing member 178, such as the pin depressing member 178 of a refrigerant service coupling, is placed in a position wherein it can depress the pin member 76 of the pin extender 18, the depression of the pin member 76 by the pin depressing member 178 will cause a depression of the open/close pin 86 of the Schrader valve 29. When the open/close pin 86 is so depressed, the Schrader valve 29 will open the refrigerant port 12, to allow the passage of refrigerant through the existing refrigerant port 12, either into the system (if the refrigeration system is being charged), or out of the system (if the refrigeration system is being evacuated of refrigerant). This pin depression depth of the R-134A retro-fit port and service coupling is also specified by SAE J639.

To tighten the retro-fit port 10 onto the existing refrigerant port 12, the slot engaging tool 20 is slid over the radially outer surface 30 of the retro-fit port, so that the slot engaging members 62 of the tool 20 engage the arcuate slots 42 of the retro-fit port 10. The clockwise rotation of the tool 20 will secure the retro-fit port 10 onto the existing refrigerant port 12. Once installed, the retro-fit refrigerant port is not to be removed. Preferably, a longer term attachment means (not shown) is employed to increase the difficulty of removing the retro-fit port 10. Examples of such long term attachment means are well known in the art, and include such things as threaded adhesives, locking clips, snap rings and the like.

Figure 7:
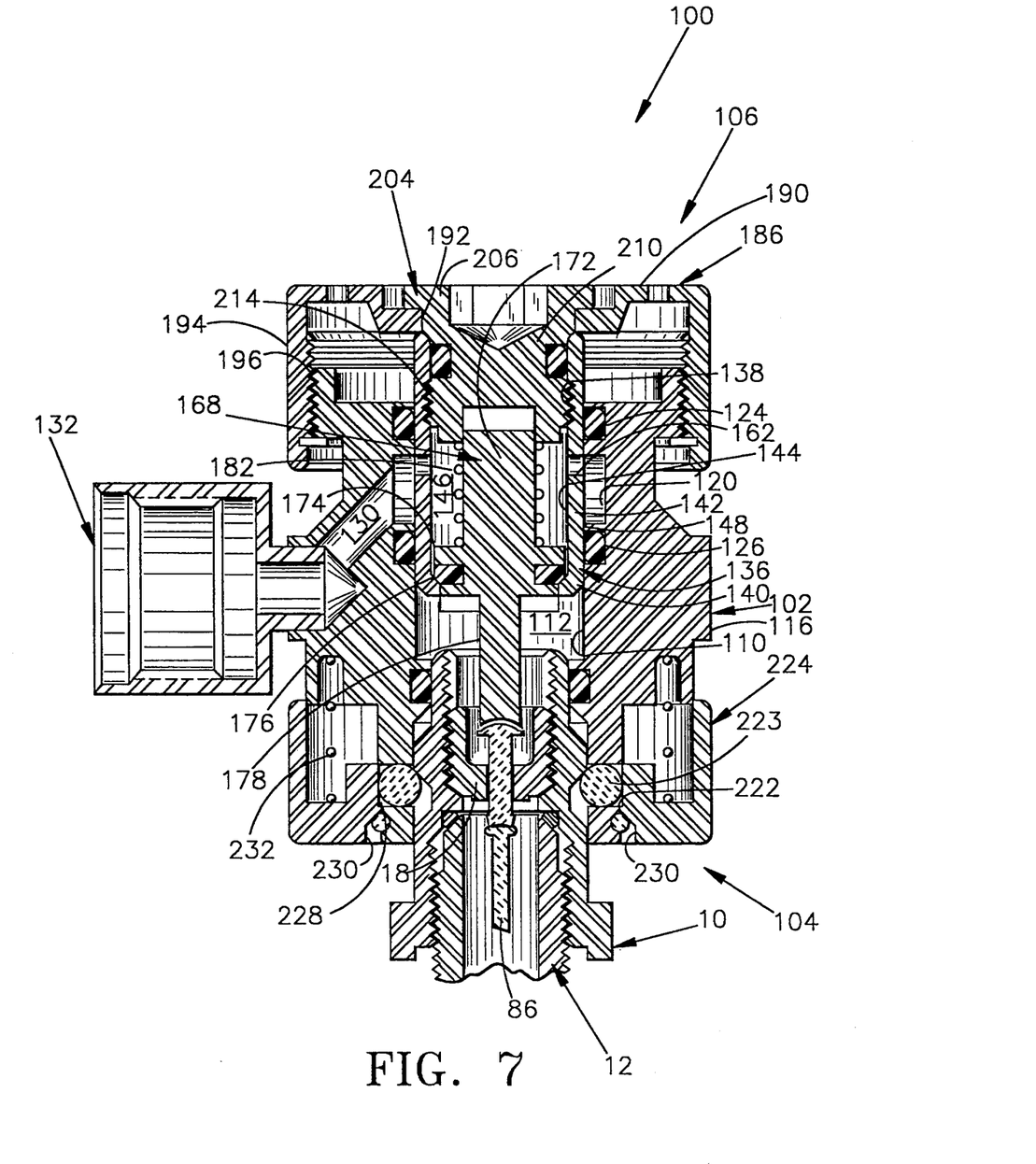
FIG. 7 is a sectional view of a refrigerant service line coupling of the present invention, showing the pin depressor member in its fully retracted position, and hence the coupling and refrigerant port in their "closed" position.

Another aspect of the present invention is a service coupling member 100 which is best shown in FIGS. 7 and 8. The purpose of the service coupling member 100 is to couple a refrigerant line (not shown) which is itself coupled to a refrigerant servicing device (such as a refrigerant charging device or refrigerant recovery device) to the refrigerant port 10 of a refrigeration system to be serviced. In the instant application, a service coupling member 100 for coupling a refrigerant line to a refrigerant type R-134A refrigerant port 10 (such as that described above) is shown. The service coupling member 100 is preferably comprised of a non-corrosive material such as brass or aluminum which will not degrade under the somewhat corrosive influence of a refrigerant. As will be described in more detail below, the service coupling member 100 includes a plurality of parts. Some of the parts (such as generally cylindrical outer body 102) are maintained in a relatively fixed position. Others of the parts, such as pin depressor member 168, inner body member 136, control cap member 186, and an outer sleeve 224, are all provided for moving relative to the generally stationary cylindrical outer body 102.

The outer body 102 includes a proximal end portion 104 which, for purposes of this patent application, is that end of the coupling 100 which is engaged onto the refrigerant port 10, and a distal end portion 106 which is that portion of the outer body 102 disposed furthest away from the refrigerant port 10. The outer body 102 also includes a radially inwardly facing surface which defines an axially extending interior passageway 112 which extends between the proximal end portion 104 and distal end portion 106 of the outer body 102.

The outer body 102, while cylindrical, does not comprise a cylindrical body having a uniform, constant inner diameter, or a constant, uniform outer diameter. Rather, both the radially inwardly facing surface 110 and radially outwardly facing surface 116 include a plurality of segments of different diameter. One of the segments of the radially inwardly facing surface is a relatively enlarged diameter circumferential fluid passageway portion 120, which is disposed generally in the distal portion of the radially inwardly facing surface 110. A first gasket means 124 is captured within a seat, and is disposed generally distally of the circumferential fluid passageway portion 120. A second gasket means 126 is captured within a seat 126, and is disposed generally proximally of the circumferential fluid passageway 120. The first and second gaskets 124, 126 provide a refrigerant-tight seal between the radially inwardly facing surface 110 of the cylindrical outer body 102, and the radially outwardly facing surface 148 of the inner body member 136, to maintain refrigerant within the circumferential fluid passageway 120.

The circumferential fluid passageway 120 is in fluid communication with a radially extending fluid inlet passageway 130 which extends between the radially inwardly facing surface 110 of the cylindrical outer body 102, and the radially outwardly facing surface 116 of the outer body 102, to transport refrigerant between the axially extending interior passageway 112 and a fluid conduit port 132. Although not shown in the drawings, the fluid conduit port 132 is preferably coupled to a refrigerant line (not shown) which extends between the coupling 100 and the refrigerant servicing device (not shown).

An inner body member 136 is disposed in the axially extending interior passageway 112 for axial movement therein. The inner body member 136 has a threaded distal end 138, a proximal end 140 having an axially opening aperture, and a wall 142 extending between the proximal end 140 and the distal end 138. The wall 142 includes a radially inwardly facing surface 144 which defines an interior 146, and a radially outwardly facing surface 148 which defines a boundary of the circumferential fluid passageway 120. The radially outwardly facing surface 148 engages with the first and second gaskets 124, 126 to define the circumferential fluid passageway 120 between the two gaskets 124, 126 and the radially outwardly facing surface 148 of the inner body member 136.

The wall 142 also includes a series of apertures 162 to permit the flow of fluid (such as refrigerant in either its liquid or vapor state) between the interior 146 of the inner body member 136 and the circumferential fluid passageway 120. Through the provision of the apertures 162, the interior 146 of the inner body member 136 is in fluid communication with the circumferential fluid passageway 120.

The axially opening aperture at the proximal end 140 of the inner body member 136 defines a valve seat 164. Valve seat 164 is provided for engaging a portion of a pin depressor member 168.

Pin depressor member 168 is disposed at least partially in the interior 146 of the inner body member 136. The pin depressor member 168 includes an axially extending distal stem portion 172, a generally medially disposed valve portion 174 which contains a gasket 176 and a pin depressing stem 178 which extends axially in a proximal direction from the valve portion 174. The gasket 176 of the valve portion 174 is sized and positioned for engaging the valve seat 164, to prevent the flow of fluid through the aperture which defines the valve seat 164, between the interior 146 of the inner body member 136 and the exterior thereof. A biasing means 182 is provided for urging the gasket 176 into engagement with the valve seat 164. As will be appreciated from a comparison of FIGS. 7 and 8, the pin depressor member 168 is axially moveable relative to the inner body member 136. As shown in FIG. 7, the biasing means 182 biases pin depressor member 168 in a proximal direction, to cause the gasket 176 to engage with the valve seat 164. In this position, fluid cannot flow between the interior 146 of the inner body member, and the exterior thereof. However, as shown in FIG. 8, the pin depressor member 168 can be moved in an axially, distal direction through the compression of the biasing means 182, to unseat the gasket 176 from the valve seat 164. When so unseated, fluid can pass between the interior 146 of the inner body member 136, and the exterior thereof, through the aperture which defines the valve seat 164. It should be noted that the ability of the pin depressor member 168 to move axially distally is limited by the plug member 204, and more particularly by the proximal end of the probe portion 210 of the plug member 204.

A control cap member 186 is coupled to the distal portion of the cylindrical outer body 102. Control cap member 186 includes a radially extending portion 190 having a central aperture 192. The control cap member 186 also includes an axially extending flange portion 194 having a threaded radially inner surface 196 for engaging the threaded distal portion of the radially outer surface of the cylindrical outer body 102. The rotational engagement of the threads of the control cap member 186 and the cylindrical outer body 102 causes an axial movement of the control cap member 186 relative to the cylindrical outer body 102. A retaining member 202 is provided for retaining the control cap on the outer body member 102.

A plug member 204 is provided for coupling together the control cap member 186 and the inner body member 136, so that rotational movement of the control cap member 186 results in axial movement of the inner body member 136. The plug member 204 includes a head portion 206 which is disposed distally of the control cap member 186, and an axially extending probe portion 210 which extends through the aperture 192 of the control cap member 186. The probe portion 210 includes a threaded radially outer surface 214 for threadedly engaging the threaded radially inner surface of the distal portion 138 of the inner body member 136. The threaded engagement between the control cap member 186 and the inner body member 136 not only provides a fixed coupling, but also provides a sealed relationship so that refrigerant cannot pass out of the coupling member 100.

The coupling between the plug member 204 and the control cap member 186 couples the two together so that rotation of the control cap member 186 in its threaded engagement with the cylindrical outer body 102 imparts an axial movement to the plug member 204, the inner body member 136, and the pin depressor member 168.

An engagement means is provided at the proximal end 104 of the cylindrical body, for enabling the coupling member 100 to engage to a refrigerant port, such as refrigerant port 10.

The engagement means includes at least two radially extending apertures 222 which are formed in the proximal end 104 portion of the cylindrical outer body 102. One or more locking elements 223 are also provided. The locking elements 223 are placed within the radial apertures 222, and can comprise ball bearings. The locking elements 223 are radially movable in the radial apertures 222 between an engaged position wherein the locking elements 223 are positioned relatively radially inwardly, and a disengaged position wherein the locking elements 223 are allowed to move relatively radially outwardly. When the locking elements 223 are in their engaged position, the space between opposed locking elements 223 is sufficiently small so that the race 36 of the refrigerant port 10 is trapped interiorly (distally) of the locking elements 223. When the locking elements 223 are moved to their disengaged position, the available space between a pair of opposed locking elements 223 is sufficiently greater than the diameter of the race 36, to allow the race 36 to be moved either into engagement or out of engagement with the coupling member 100.

The engagement means also includes an outer sleeve 224 which is axially moveable with respect to the relatively stationary cylindrical outer body 102. The outer sleeve 224 has a radially inwardly facing surface. The radially inwardly facing surface includes a relatively reduced diameter portion 228 and an enlarged diameter portion 230. The outer sleeve 224 is moveable axially between an engaged position wherein the reduced diameter portion 228 engages the locking elements 223 into their engaged position to engage the refrigerant port 10 and thereby fixedly couple the refrigerant port 10 to the coupling member 100. The outer sleeve 224 is also moveable axially in a distal direction to its disengaged position wherein the enlarged diameter portion 230 of the radially inwardly facing surface permits the locking member ball bearings 223 to move radially outward in the at least two radial apertures 222 so that the refrigerant port 10 can be disconnected from the coupling member 100. A biasing means such as spring 232 is provided for normally biasing the outer sleeve 224 in a proximal direction, into its engaged position.

In operation, the device performs as follows. Assume first that the coupling 100 is not engaged to the refrigerant recovery port 10. The first thing that must occur is that the control cap member 186 must be rotated to its furthest-most distal position. If the control cap member 186 is not in its furthest-most distal position, the coupling 100 is configured so that the position of the stem 178 prevents the refrigerant coupling refrigerant port 10 from becoming engaged with the coupling member 100. Once the control cap member 186 is so rotated to its distal-most position, the refrigerant port 10 can be inserted into the distal end 104 of the cylindrical outer body 102.

The outer sleeve 224 is moved in an axial, distal direction so that the enlarged diameter portion 230 is placed opposite the locking elements 223, to allow the locking elements 223 to move radially outwardly into their disengaged position. When this is accomplished, the refrigerant port 10 can be fully inserted into the axially extending interior passageway 112, to a position wherein the race 36 is positioned distally of the locking elements 223. When this is accomplished, the outer sleeve 224 is released, so that the biasing means 232 can move the outer sleeve 224 in a proximal direction, so that the reduced diameter portion 228 is moved adjacent to the locking elements 223, to maintain the locking elements 223 in their engaged position. When this occurs, the locking elements 223 engage the race 36, to maintain the race 36 distally of the locking elements 223, thus maintaining the refrigerant port 10 in an engaged relationship with the coupling member 100.

The control cap member 186 is then rotated in a clockwise direction, to move the control cap member 186 axially in a proximal direction toward the refrigerant port 10. The coupling between the control cap member 186, plug member 204 and inner body member 136, causes the pin depressor member 168 to move in an axial, proximal direction. When the control cap member 186 is fully rotated so as to move it into its proximal-most position (FIG. 8), the pin depressing stem 178 is placed into engagement with the pin member 76 of the pin extender member 18. The pin member 76 then engages the open/close pin 86 of the Schrader valve 29 of the existing refrigerant port 12, to open the existing refrigerant port 12, to allow fluid to flow out of (or into) the existing refrigerant port 12, and hence the refrigeration system. It should be noted that engagement between the pin depressing stem 178, pin member 76, and open/close pin 86 is such that the gasket 176 of the valve portion 174 of the pin depressor member 168 is caused to move off of its valve seat 164. When this occurs, fluid flowing through the refrigerant port 12, can flow into the interior 146 of the inner body 136. Fluid within the interior 146 of the inner body can flow through the apertures 162, into the circumferential passageway 120. From the circumferential passageway 120, fluid can flow through the radially extended passageway 130 into the fluid conduit port 132, and hence into the refrigerant servicing device (not shown). It should also be noted that retro-fit ports such as 10, not requiring a pin extender such as 18, are also accessed in an identical fashion but make immediate contact to Schrader valve 86.

Although the passage above describes what would normally occur during the recovery of refrigerant from a refrigeration system, it will be appreciated that during the charging of a refrigeration system with refrigerant, fluid would flow in the opposite direction, from the fluid conduit port 132, into the radially extending passageway 130, and into the circumferential fluid passageway 120. From the circumferential fluid passageway 120 fluid would flow through the apertures 162 into the interior 146 of the inner body member 136, around the valve seat 164, to the interior of refrigerant port 10, and ultimately into the refrigeration system to be serviced.

After the user has finished servicing the refrigeration system, the control cap member 186 is rotated in a counterclockwise direction, to move the pin depressor 168 in an axially distal direction. This moves the pin depressing stem 178 out of engagement with member 76. When this occurs, the open/close pin 86 of the Schrader valve 29 of the existing refrigerant port 12 is caused to close. The closing of the Schrader valve 29 prevents any fluid from entering into, or escaping from the refrigeration system. When the control cap member 186 is rotated into its distal-most (closed) position (as shown in FIGS. 7), the biasing means 182 forces the pin depressor 168, and hence gasket 176 into engagement with valve seat 164, thus closing off the interior 146 of the inner body member 136, and hence the circumferentially passageway 120. At this point, the retro-fit port 10 can be disconnected from the coupling 100, by moving the outer sleeve 224 in a distal direction, against the force of the biasing means 232, to permit the locking elements 223 to move radially outwardly. When the locking elements 223 are allowed to move radially outwardly, the distance between them is sufficiently great so as to permit the race 36 to pass between the locking elements 223, thus permitting the refrigerant port 10 to become disengaged from the coupling member 100.

Having described the invention in detail, and by reference to the preferred embodiments thereof, it will be apparent that modifications and variations are possible without departing from the scope of the invention as defined in the appended claims.

What is claimed is:

1. A coupling member for coupling a refrigerant line to a refrigerant port, the coupling member comprising:
(a) an outer body member having a proximal end portion, a distal end portion, a radially inwardly facing surface defining an axially extending interior passageway, and a radially outwardly facing surface having a threaded distal end portion, the radially inwardly facing surface including a circumferential fluid passageway portion, (b) a radially extending fluid inlet passageway extending between the circumferential fluid passageway and the radially outwardly facing surface, (c) an inner body member disposed in the axially extending interior passageway for axial movement therein, the inner body member including a wall having a radially inwardly facing surface defining an interior of the inner body member, and a radially outwardly facing surface defining at least a partial boundary of the circumferential fluid passageway, (d) a pin depressor member disposed at least partially in the interior of the inner body member, (e) a control cap member adjustably positionable with respect to the outer body, the control cap member including a generally sheet-like radially extending portion having a perimeter and an axially extending flange portion disposed generally adjacent to the perimeter of the radially extending portion, the axially extending flange portion including threads for engaging the threaded distal end portion of the radially outwardly facing surface of the outer body portion and (f) a means for coupling the control cap member and inner body member so that adjustment of the axial position of the control cap member permits axial movement of the inner body member and pin depressor member.

2. The invention of claim 1 further comprising a first gasket means disposed on the radially inwardly facing surface of the outer body and positioned in a distal direction from the circumferential fluid passageway, and a second gasket means disposed on the radially inwardly facing surface of the outer body, and positioned in a proximal direction from the circumferential fluid passageway.

3. The invention of claim 1 further comprising a radially extending fluid conduit port coupled to the radially extending fluid passageway, the radially extending fluid conduct port including a relatively reduced diameter portion disposed adjacent to the radially outwardly facing surface of the outer body member, and a relatively enlarge diameter portion disposed in a spaced relation to the outwardly facing surface of the outer body member.

4. The invention of claim 3 wherein the threaded distal end portion of the outer body member, the axially extending flange portion of the control cap member, the reduced diameter portion of the fluid conduit port and the enlarged diameter portion of the fluid conduit port are sized and positioned for receiving at least a portion of the axially extending flange portion of the control cap member in the space between the outer body member and the enlarged diameter portion of the fluid conduit port.

5. The invention of claim 1 wherein the inner body member includes an axially opening aperture defining a valve seat.

6. The invention of claim 5 wherein the pin depressor member includes (a) an axially extending distal stem portion, (b) a valve portion for selectively engaging the valve seat in a sealing relation, and (c) a pin depressing stem extending axially from the valve portion.

7. The invention of claim 1 wherein the plug member includes means for engaging the inner body member.

8. The invention of claim 1 further comprising an engagement means disposed at the proximal end of the outer body member for engaging a refrigerant port, the engagement means including at least two radial apertures disposed in the proximal portion of the outer body member, and locking elements placeable in the radial apertures and moveable between an engaged portion a disengaged position.

9. The invention of claim 8 wherein the engagement means includes:

(a) an outer sleeve means having a radially inwardly facing surface, the radially inwardly facing surface having a reduced diameter portion and an enlarged diameter portion, the outer sleeve means being moveable axially between an engaged position wherein the reduced diameter portion engages the locking members to move the locking members into their engaged position to engage the refrigerant port to fixedly couple the refrigerant port to the coupling member, and a disengaged position wherein the enlarged diameter portion permits the locking members to move radially outwardly in the at least two radial apertures to their disengaged position so that the refrigerant port can be disconnected from the coupling member, and (b) a biasing means for normally biasing the outer sleeve into its engaged position.

10. A coupling member for coupling a refrigerant line to a refrigerant port, the coupling member comprising:

(a) an outer body member having a proximal end portion, a distal end portion a radially inwardly facing surface defining an axially extending interior passageway, and a radially outwardly facing surface the radially inwardly facing surface including a circumferential fluid passageway portion, (b) a radially extending fluid inlet passageway extending between the circumferential fluid passageway and the radially outwardly facing surface, (c) an inner body member disposed in the axially extending interior passageway for axial movement therein, the inner body member including a wall having a radially inwardly facing surface defining an interior of the inner body member, and a radially outwardly facing surface defining at least a partial boundary of the circumferential fluid passageway, (d) a pin depressor member disposed at least partially in the interior of the inner body member, e) a control cap member adjustably positionable with respect to the outer body member, and (f) a means for coupling the control cap member and inner body member so that adjustment of the axial position of the control cap member facilitates axial movement of the inner body member and pin depressor member, wherein the control cap member includes a radially extending portion, and an aperture formed in the radially extending portion, and the means for coupling the control cap member and inner body member comprises a plug member insertable through the aperture and coupled to the inner body member.

11. The invention of claim 10 wherein the plug member includes a head disposed distally of the radially extending portion of the control cap member, and a probe portion extending through the aperture in the radially extending portion of the control cap member, the probe portion including a threaded surface for threadedly engaging the inner body member to fixedly couple the control cap member, plug member and inner body member.

12. The invention of claim 10 wherein the distal portion of the radially outer surface of the outer body member includes threads, and the control cap member includes a flange portion having a threaded radially inner surface engageable with the threads of the radially outer surface of the outer body member, wherein rotation of the control cap member in its threaded engagement with the outer body member permits axial movement of the inner body member.

13. A coupling member for coupling a refrigerant line to a refrigerant port, the coupling member comprising:

an outer body member having a proximal end portion a distal end portion, a radially inwardly facing surface defining an axially extending interior passageway, and a radially outwardly facing surface, the radially inwardly facing surface including a circumferential fluid passageway portion, (b) a radially extending fluid inlet passageway extending between the circumferential fluid passageway and the radially outwardly facing surface, (c) an inner body member disposed in the axially extending interior passageway for axial movement therein, the inner body member including a wall having a radially inwardly facing surface defining an interior of the inner body member, and a radially outwardly facing surface defining at least a partial boundary of the circumferential fluid passageway, (d) a pin depressor member disposed at least partially in the interior of the inner body member, the pin depressor member including an axially extending distal stem portion, a valve portion, and a pin depressing stem extending axially from the valve portion, (e) a control cap member adjustably positionable with respect to the outer body member, and (f) a means for coupling the control cap member and inner body member so that adjustment of the axial position of the control cap member permits axial movement of the inner body member and pin depressor member.

14. The invention of claim 13 wherein the inner body member includes an axially extending aperture defining a valve seat, and the pin depressor member includes a gasket means for selectively engaging the valve seat, and a biasing means for biasing the gasket means into engagement with the valve seat, and for permitting the gasket means to move out of engagement with the valve seat when the pin depressing stem is engaged with a refrigerant port.

15. The invention of claim 14 wherein the means for coupling the control cap member to the inner body member comprises a plug member having a probe portion for limiting the amount of axial movement of the pin depressor member.

16. The invention of claim 13 wherein the means for coupling the control cap member to the inner body member comprises a plug member, the plug member including a head disposed exteriorly of the radially extending portion, and a probe portion extending interiorly of the control cap member and operatively coupled to the inner body member.

17. The invention of claim 16 wherein the inner body member includes an axially extending opening aperture defining a valve seat, and the pin depressor includes a gasket means for selectively engaging the valve seat, and a biasing means for biasing the gasket into engagement with the valve seat and for permitting the pin depressor member to move axially to allow the gasket means to move out of engagement with the valve seat to allow fluid to flow out of the interior of the inner body member, the probe portion of the plug member being positioned to limit the axial movement of the pin depressor member.

18. The invention of claim 17 wherein the control cap member includes a radially extending portion having an aperture, and a flange portion having a threaded radially inner surface, the radially outer surface of the distal portion of the outer body member is threaded for engaging the threaded radially inner surface of the flange portion of the control cap member, and the probe portion of the plug member extends through the aperture of the radially extending portion.

19. A coupling member for coupling a refrigerant line to a refrigerant port, the coupling member comprising;

(a) an outer body member having a proximal end portion a distal end portion, a radially inwardly facing surface defining an axially extending interior passageway, and a radially outwardly facing surface the radially inwardly facing surface including a circumferential fluid passageway portion, (b) a radially extending fluid inlet passageway extending between the circumferential fluid passageway and the radially outwardly facing surface, (c) an inner body member disposed in the axially extending interior passageway for axial movement therein the inner body member including a wall having a radially inwardly facing surface defining an interior of the inner body member, and a radially outwardly facing surface defining at least a partial boundary of the circumferential fluid passageway, (d) a pin depressor member disposed at least partially in the interior of the inner body member, (e) a control cap member adjustably positionable with respect to the outer body member, and (f) means for coupling the control cap member ad inner body member so that adjustment of the axial position of the control cap member permit axial movement of the inner body member and pin depressor member, the means for coupling the control cap and inner body member includes a plug member operatively coupled to each of the control cap member and inner body member.

20. The invention of claim 19 wherein the control cap member includes an aperture, and the plug member includes a head disposed distally of the control cap member, and a probe portion extending through the aperture in the radially extending portion, the probe portion including a threaded surface for threadedly engaging the inner body member.

21. A coupling member for coupling a refrigerant line to a refrigerant port, the coupling member comprising (a) a generally cylindrical outer body member having a proximal end portion, a distal end portion, a radially inwardly facing surface defining an axially extending interior passageway, and a radially outwardly facing surface, the radially inwardly facing surface having a plurality of segments of different diameter, including a relatively enlarged diameter circumferential fluid passageway portion, a first gasket means positioned in a distal direction from the circumferential fluid passageway portion, and a second gasket means positioned in a proximal direction from the circumferential fluid passageway portion, (b) a radially extending fluid inlet passageway extending between the circumferential fluid passageway and the radially outwardly facing surface, (c) a fluid conduit port coupled to the radially extending fluid inlet passageway for coupling the refrigerant line to the coupling member, (d) an inner body member disposed in the axially extending interior passageway for axial movement therein, the inner body member having a threaded distal end, a proximal end, and a wall extending between the proximal end and the distal end, the wall including a radially inwardly facing surface defining an interior, a radially outwardly facing surface defining a boundary of the circumferential fluid passageway, and at least one aperture extending through the wall between the radially inwardly facing surface and the radially outwardly facing surface to permit fluid flow between the circumferential passageway and the interior of the inner body member, the proximal end of the inner body member including an axially opening aperture defining a valve seat, (e) a pin depressor member disposed at least partially in the interior of the inner body member, the pin depressor member including (1) an axially extending distal stem portion, (2) a valve portion for selectively engaging the valve seat in a sealing relation, (3) a pin depressing stem extending axially from the valve portion, (f) a biasing means for biasing the valve portion into engagement with the valve seat, (g) a control cap member threadedly engaged to the radially outwardly facing surface of the outer body member, the control cap member including a control cap aperture, (h) a plug member including a head portion disposed distally of the control cap member, and a probe portion extending through the control cap aperture, the probe portion being threadedly engaged to the inner body member to fixedly couple the control cap member, plug member, and inner body member so that rotation of the control cap member in its threaded engagement with the body imparts axial movement to the plug member, inner body member and pin depressor member, and (i) an engagement means disposed at the proximal end of the outer body member for engaging the refrigerant port.

22. The invention of claim 21 wherein the engagement means includes (a) at least two radial apertures disposed in the proximal portion of the body, locking elements placeable in the radial apertures and moveable between an engaged position and a disengaged position, (c) an outer sleeve means having a radially inwardly facing surface, the radially inwardly facing surface having a reduced diameter portion and an enlarged diameter portion, the outer sleeve means being moveable axially between an engaged position wherein the reduced diameter portion engages the locking members to move the locking members into their engaged position to engage the refrigerant port to fixedly couple the refrigerant port to the coupling member, and a disengaged position wherein the enlarged diameter portion permits the locking members to move radially outwardly in the at least two radial apertures to their disengaged position, wherein the refrigerant port can be disconnected from the coupling member, and (d) a biasing means for normally biasing the outer sleeve into its engaged position.

23. A coupling member for coupling a refrigerant line to a refrigerant port, the coupling member comprising:

(a) an outer body member having a proximal end portion, a distal end portion, a radially inwardly facing surface defining an axially extending interior passageway, and a radially outwardly facing surface having a threaded distal end portion, the radially inwardly facing surface including a circumferential fluid passageway portion, (b) a radially extending fluid inlet passageway extending between the circumferential fluid passageway and the radially outwardly facing surface, (c) a radially extending fluid conduit port including a relatively enlarged diameter portion disposed in a spaced relation to the outwardly facing surface of the outer body member, and a relatively reduced diameter portion at least partially disposed between the relatively enlarged diameter portion of the fluid conduit port and the outwardly facing surface of the outer body member, the relatively enlarged diameter portion of the radially extending fluid conduit and the outwardly facing surface of the outer body member defining a space therebetween, (d) an inner body member disposed in the axially extending interior passageway for axial movement therein, the inner body member including a wall having a radially inwardly facing surface defining an interior of the inner body member, and a radially outwardly facing surface, (e) a pin depressor member disposed at least partially in the interior of the inner body member, (f) a control cap member adjustably positionable with respect to the outer body, the control cap member including an axially extending flange portion sized and positioned for being at least partially received in the space between the relatively enlarged diameter portion of the fluid conduit and the radially outwardly facing surface of the outer body member, and (g) a means for coupling the control cap member and inner body member so that adjustment of the axial position of the control cap member permits axial movement of the inner body member and pin depressor member.

24. The invention of claim 23 wherein axially extending flange portion of the control cap member is threaded for engaging the threaded distal end portion of the radially outwardly facing surface, and the outer body member, reduced diameter portion of fluid conduit port, and the enlarged diameter portion of the fluid conduit port are sized and positioned for receiving at least a portion of the axially extending flange portion of the control cap member in the space between the outer body member and the enlarged diameter portion of the fluid conduit.

25. The invention of claim 23 wherein the control cap member includes a generally sheet-like radially extending portion and an axially extending flange portion disposed generally adjacent to the perimeter of the radially extending portion, the axially extending flange portion including threads for engaging the threaded distal end portion of the radially outwardly facing surface of the outer body portion.

* * * * *